United States Patent Office 2,766,245
Patented Oct. 9, 1956

2,766,245

$\Delta^6$ DEHYDROISOMORPHINANES INTERMEDIATES AND PROCESS FOR THE PRODUCTION THEREOF Marshall D. Gates, Jr., Pittsford, N. Y., assignor to Merck & Co., Inc., Rahway, N. J., a corporation of New Jersey No Drawing. Application February 28, 1951, Serial No. 213,287

43 Claims. (Cl. 260—285)

This invention is concerned generally with novel chemical compounds and to processes of preparing same; more particularly, it relates to novel compounds useful as intermediates in the synthesis of new $\Delta^6$-dehydroisomorphinane compounds, and processes for preparing the same. This application is a continuation-in-part of copending application Serial No. 101,463, filed June 25, 1949, now abandoned.

The novel $\Delta^6$-dehydroisomorphinane compounds may be represented by the formula

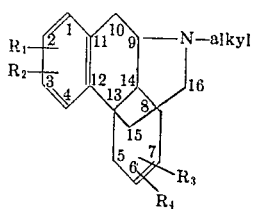

wherein $R_1$, $R_2$, $R_3$ and $R_4$ represents hydrogen, alkyl, or alkoxy radicals. These isomorphinane compounds are useful as analgesics.

In accordance with this invention, these $\Delta^6$-isomorphinane compounds can be prepared by reactions indicated as follows:

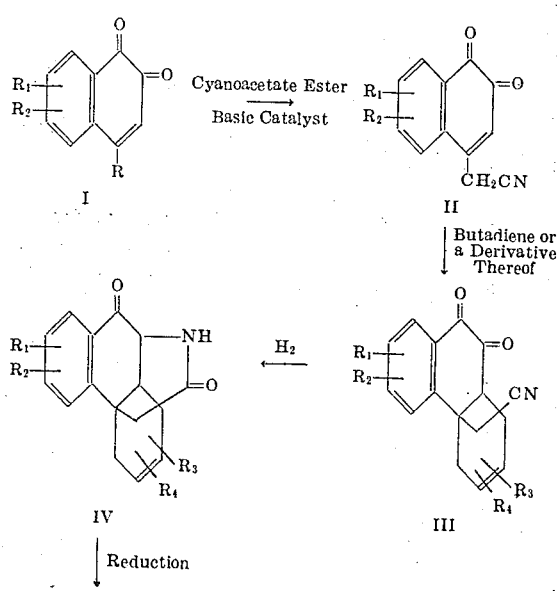

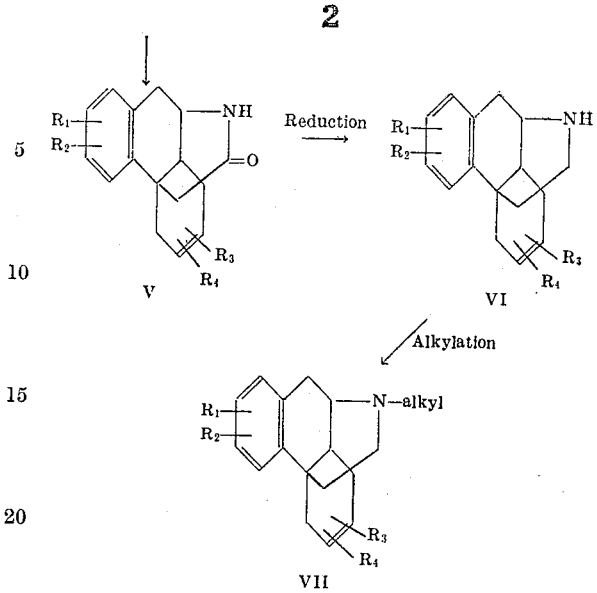

In the above formulae R represents hydrogen or a sulfonyl group, and $R_1$, $R_2$, $R_3$, and $R_4$ are the same as previously defined.

The reactions indicated above are carried out as follows:

A 1,2-naphthoquinone (I) is converted to the corresponding 4-cyanomethyl compound (II) by reaction with a cyanoacetic acid ester in the presence of a basic catalyst to form the corresponding 4-carboxy cyanomethyl ester which may be isolated (M. P. 127° C.) or used without isolating by direct reaction with an excess of alkali to produce the desired 4-cyanomethyl compound. This compound (II) is then reacted with butadiene or a substituted derivative thereof to produce the 9,10-dioxo-13 - cyanomethyl - 5,8,9,10,13,14 - hexahydrophenanthrene compound (III). Upon reacting the hexahydrophenanthrene compound with hydrogen in the presence of a catalyst, the 10,16-dioxo-$\Delta^6$-dehydroisomorphinane compound (IV) results. This latter product (IV) is then further reduced to remove the 10-keto substituent and form the 16-oxo-$\Delta^6$-dehydroisomorphinane (V). By reducing compound V in the presence of a hydrogenation catalyst, the $\Delta^6$-dehydroisomorphinane compound (VI) results. This compound (VI) is then alkylated to produce the corresponding N-alkyl-$\Delta^6$-dehydroisomorphinane (VII).

In accordance with one embodiment of my process, a 1,2-naphthoquinone (I) is reacted with a cyanoacetic acid ester in the presence of a strong base to produce an intermediate compound, the 4-carboxy-cyanomethyl ester, which upon reaction with an alkali is converted to the desired 4-cyanomethyl compound (II). In effecting this condensation, I may utilize a naphthoquinone unsubstituted in the 4 position, or a naphthoquinone having a sulfonic acid substituent in the 4 position. Depending upon the naphthoquinone being reacted, I find that it is sometimes preferable to utilize the 4-sulfonic acid derivative since such derivatives are more readily soluble. I find that the reaction is most readily effected by carrying out the condensation in a suitable solvent medium such as water, lower aliphatic alcohols, an aqueous-lower aliphatic alcohol medium; and the like, at temperatures below about 30° C. Various strong bases such as organic amines, alkali metal hydroxides, and the like are suitable for use as catalysts to effect the desired condensation. Generally, I find that under optimum conditions maximum yields of the product are obtained by using a lower aliphatic alcohol ester of cyanoacetic acid, although any ester is satisfactory for this purpose.

The conversion of the intermediate carboxy cyanomethyl ester compound to the desired cyanomethyl naphthoquinone is most conveniently carried out directly without isolating the intermediate compound, although this product is readily recovered by acidifying the reaction product of the cyanoacetic acid ester and the naphthoquinone, and separating the precipitated intermediate compound. Hydrolysis and decarboxylation of the intermediate 4-carboxy cyanomethyl ester is accomplished by reacting this compound with an excess of a strong base, such as an alkali metal hydroxide. After completion of the reaction, the mixture is acidified causing precipitation of the desired 4-cyanomethyl compound which is then recovered and purified in accordance with conventional practice.

Thus, by employing the process described above, suitable starting materials such as 1,2-naphthoquinone, 1,2-naphthoquinone-4-sulfonic acid or an alkyl or alkoxy substituted naphthoquinone, for example 5,6-dimethoxy-1,2-naphthoquinone, 5-ethoxy-1,2-naphthoquinone, 6-methoxy-1,2-naphthoquinone, 6,7-diethyl-1,2-naphthoquinone, 6-methyl-1,2-naphtho-quinone, 5-ethyl-1,2-naphthoquinone, and the like, are converted to the corresponding 4-cyanomethyl compounds.

In accordance with a further embodiment of my invention, the 4-cyanomethyl-1,2-naphthoquinone is reacted with butadiene or a substituted butadiene to obtain the corresponding 9,10-dioxo-13-cyanomethyl-5,8,9,10,13,14-hexahydrophenanthrene compound. I have found that this reaction is conveniently carried out by heating the reaction mixture of butadiene and the cyanomethyl compound under superatmospheric pressure. Generally, under optimum conditions I have obtained maximum yields by effecting this reaction in an inert anhydrous solvent medium, at temperatures ranging from 50–100° C., particularly good results being obtained when dioxane is used as the solvent medium. After the reaction is completed, the reaction product is readily recovered by evaporating the excess butadiene and solvent medium and crystallizing the residue from a suitable solvent.

By this method butadiene is reacted with 4-cyanomethyl-1,2-naphthoquinone and alkyl or alkoxy derivatives thereof such as the 5,6-dimethoxy-5-ethoxy, 5-ethyl, 5,6-dimethyl, or 6-methyl derivatives to obtain the corresponding 9,10-dioxo-13-cyanomethyl-5,8,9,10,13,14-hexahydrophenanthrene compound. Alternatively, by carrying out this reaction with a substituted butadiene, the corresponding hexahydrophenanthrene compound is prepared. For example by reacting 4-cyanomethyl-1,2-naphthoquinone with isoprene

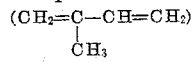

6-methyl-9,10-dioxo-13-cyanomethyl-5,8,9,10,13,14-hexahydrophenanthrene and also the isomeric 7-methyl-9,10-dioxo-13-cyanomethyl-5,8,9,10,13,14-hexahydrophenanthrene are obtained; or by reacting the same cyanomethyl compound with 2-ethoxy butadiene the corresponding 6-ethoxy-hexahydrophenanthrene and also the isomeric 7-ethoxy-hexahydrophenanthrene are obtained.

Pursuant to another embodiment of my invention, the 9,10-dioxo-13-cyanomethyl-5,8,9,10,13,14-hexahydrophenanthrene compound is then reacted with hydrogen at elevated temperatures in the presence of a copper-chromium oxide hydrogenation catalyst to form the corresponding 10,16-dioxo-$\Delta^6$-dehydroisomorphinane compound. For the obtainment of maximum yields, I have found that under optimum conditions it is preferable to conduct this hydrogenation in the presence of the copper-chromium oxide catalyst at a temperature of about 135° C. in a suitable inert solvent medium such as absolute alcohol. When the hydrogenation is carried out at temperatures substantially in excess of 135° C., the product is further reduced to the corresponding 10-hydroxy compound.

By the application of the foregoing process, 9,10-dioxo-13-cyanomethyl-5,8,9,10,13,14 and the substituted derivatives thereof such as the 3,4-dimethoxy, 3-ethyl, 4-methoxy, 3-ethoxy, 3,4-dimethoxy-6-methyl, 3-methoxy-6-ethoxy, 4-ethoxy-6-methoxy compounds, and the like are converted to the corresponding 10,16-dioxo-$\Delta^6$-dehydroisomorphinane compounds.

In accordance with a further embodiment of my process, the 10,16-dioxo-$\Delta^6$-dehydroisomorphinane is reduced to the corresponding 16-oxo-$\Delta^6$-dehydroisomorphinane. I find that this is conveniently accomplished by utilizing the Wolff-Kishner method comprising heating the compound with hydrazine hydrate and an alkali metal hydroxide in the presence of ethylene glycol. The reduction product is then recovered by pouring the reaction mixture into a large volume of water thereby precipitating the 16-oxo-$\Delta^6$-dehydroisomorphinane compound which is recovered in accordance with conventional procedures.

It is indeed surprising that the Wolff-Kishner method of reduction can be utilized to effect removal of the 10-keto group without effecting the carbonyl group in the 16-position. It might have been anticipated that under the strenuous reaction conditions the amide group would be hydrolyzed causing an opening of the heterocyclic ring.

Thus by this method of removing the 10-keto substituent, 10,16-dioxo-$\Delta^6$-dehydroisomorphinane and the alkyl and alkoxy derivatives thereof are converted to the corresponding 16-oxo-$\Delta^6$-dehydroisomorphinane compounds. When alkoxy substituted compounds are reduced, it is usually necessary to realkylate the reduction product to obtain maximum yields, since under the reaction conditions at least a portion of the alkoxy substituents appear to be hydrolyzed.

By another process of my invention, the $\Delta^6$-dehydroisomorphinane compound is prepared by further reduction of the 16-oxo-compound with lithium aluminum hydride. This reduction is readily effected by reacting the 16-oxo compound with lithium aluminum hydride in a suitable inert anhydrous solvent such as tetrahydrofuran under reflux. The reaction product is recovered, for example, by decomposing the reaction mixture with dilute acid, filtering the resulting reaction mixture, adding the acidified filtrate to an alkaline solution of sodium tartrate, extracting the $\Delta^6$-dehydroisomorphinane with ether, and concentrating the ether extract to dryness.

By this method of reduction with lithium aluminum hydride, 16-oxo-$\Delta^6$-dehydroisomorphinane and the alkyl and alkoxy substituted derivatives thereof are converted to the corresponding $\Delta^6$-dehydroisomorphinane compounds.

The $\Delta^6$-dehydroisomorphinane compounds can be readily converted to the corresponding N-alkyl derivatives in accordance with conventional chemical procedures. For example, the $\Delta^6$-dehydroisomorphinane can be reacted with formic acid and formaldehyde to obtain the corresponding N-methyl derivative.

The following examples are presented as specific embodiments of my invention.

EXAMPLE 1

*Preparation of 4-cyanomethyl-1,2-naphthoquinone*

Thirty-five grams of pure anhydrous 1-amino-2-naphthol-4-sulfonic acid is used as a starting material in the preparation of the above compound. Oxidation of this material is accomplished through the addition of 14.5 cc. of nitric acid (specific gravity 1.42) in 40 cc. of water. The reaction is allowed to proceed only to the stage of the 1,2-naphthoquinone-4-sulfonic acid which is then dissolved in 460 cc. of water and cooled to 10–15° C. in an ice bath, Twenty-one and five-tenths cc. of ethyl cyanoacetate in 300 cc. of methanol is added all at once with vigorous stirring, followed immediately by the addition of 60 cc. of 25% sodium hydroxide solution, the temperature being maintained at 10–15° C.

Stirring of the reaction mixture is continued for 2½ minutes and the dark purple solution is then diluted by the addition of 180 cc. of methanol. A solution of 87 g. of sodium hydroxide in 700 cc. of water is added all at once with stirring, the temperature then being maintained between 15° and 20° C. Stirring is continued for approximately 5 minutes until the deep purple color of the reaction mixture completely turns into a clear red color. The mixture is then cooled down to 5–10° C. by the addition of ice and 231 cc. of hydrochloric acid (specific gravity 1.178) is added until the mixture is just rendered acid to a Congo red indicator. With the temperature maintained below 20° C. bright yellow crystalline material precipitates having a melting point of 197–203.5° C. corr. The crystalline material is separated from the reaction mixture by filtration with a Buchner funnel.

EXAMPLE 2

Preparation of 4-cyanomethyl-1,2-naphthoquinone 1-amino-2-naphthol-4-sulfonic acid (100 g., technical product, washed thoroughly with alcohol and dried) was oxidized to the corresponding 1,2-quinone as described in Org. Syn. 21, 91 (1941), and the thick paste of free sulfonic acid was dissolved in 1.3 liters of water, cooled to 10° C., and treated with a solution of 63 g. of ethyl cyanoacetate in 850 cc. of methanol. One hundred and seventy cc. of 25% sodium hydroxide was then added and the deep purple solution was stirred for two or three minutes. The temperature was held below 20° C. by the addition of small amounts of ice. At the end of this period the solution was diluted with 500 cc. of methanol, cooled to 10° C. with ice, and then treated with a cooled solution of 250 g. of sodium hydroxide in 2 l. of water. Stirring was continued for about 5 minutes during which the deep purple solution changed gradually to a deep crimson with no bluish tinge, and the mixture was then acidified to Congo red after cooling to 10° C. The quinone separates as yellow microcrystalline needles, 51.0 g. (61%), air dried, M. P. 199.5°–204° C. with decomposition.

EXAMPLE 3

Preparation of 9,10-dioxo-13-cyanomethyl-5,8,9,10,13,-14-hexahydrophenanthrene

This compound is prepared using 4-cyanomethyl-1,2-naphthoquinone as a starting material. 15 g. of the starting material is suspended in 40 cc. of absolute dioxane and heated in a pressure bottle with 45 cc. of butadiene to a temperature of from 70–80° C. in an oil bath. The reaction is continued for 48 hours after which the reaction mixture is cooled and the excess butadiene is removed by evaporation, along with the dioxane. The evaporation is carried out using boiling chips. The dark brown residue from the evaporation is redissolved in methanol and treated several successive times with charcoal, which is then filtered off until the solution attains a light yellow color. Concentration of this solution yields colorless prismatic crystals of 9,10-dioxo-13 - cyanomethyl - 5,8,9,10,13,14 - hexahydrophenanthrene, M. P. 182–184° C. (corr.).

EXAMPLE 4

Preparation of 10,16-dioxo-$\Delta^6$-dehydroisomorphinane

Five grams of 9,10-dioxo-13-cyanomethyl-5,8,9,10,13,-14-hexaydrophenanthrene was hydrogenated in 75 cc. of absolute alcohol at 135° C. and 1000–1400 lbs. pressure (cold) over 600 mg. of copper-chromium oxide for one hour. The adduct is sparingly soluble in cold alcohol and it is advantageous to wait at least ten minutes after the bomb has reached 135° C. before beginning agitation. After removal of the catalyst, the dark brown solution was decolorized twice and thoroughly concentrated to yield 2.35 g. (50%) of 10,16-dioxo-$\Delta^6$-dehydroisomorphinane as light green prisms, M. P. 250–251° C. A small sample was purified for analysis by several crystallizations from methanol to give colorless prisms, M. P. 252.5–254° C.

Analysis.—Calc'd. for $C_{16}H_{15}O_2N$: C, 75.86; H, 5.96. Found: C, 75.73; H, 6.08.

The dehydro compound is insoluble in aqueous alkali. It is sparingly soluble in methanol or ethanol and only slightly soluble in cold benzene. Its solution in concentrated sulfuric acid is very pale yellow. It dissolves readily in cold 12 N hydrochloric acid and this solution on scratching deposits a crystaliine hydrochloride which on dilution with water is hydrolyzed to 10,16-dioxo-$\Delta^6$-dehydroisomorphinane. It is only partially soluble in 6 N hydrochloric acid. It is unattacked by an aqueous methanol solution of periodic acid, and can be recovered unchanged after refluxing with o-phenylenediamine in acetic acid for one hour. Its oxime was prepared in pyridine solution and crystallized from pyridine to give colorless material, M. P. 280–281° C., soluble in aqueous alkalies.

Analysis.—Calc'd. for $C_{16}H_{16}O_2N_2$: C, 71.62, H, 6.02 Found: C, 71.75; H, 6.36.

The acetyl derivative of 10,16-dioxo-$\Delta^6$-dehydroisomorphinane was prepared by refluxing in acetic anhydride containing sodium acetate and was purified by crystallization from dilute acetic acid; heavy colorless prisms, M. P. 176–178° C. when heated slowly. The M. P. may begin as low as 168° C. if it is taken rapidly. This behavior may be due to polymorphism. On boiling with aqueous alcoholic alkali, the acetyl compound is hydrolyzed to 10,16-dioxo-$\Delta^6$-dehydroisomorphinane, M. P. 251–253.5° C.

Analysis.—Calc'd. for $C_{18}H_{17}O_3N$: C, 73.20; H, 5.80. Found: C, 73.33; H, 5.95.

EXAMPLE 5

Preparation of 16-oxo-$\Delta^6$-dehydroisomorphinane

Four grams of 10,16-dioxo-$\Delta^6$-dehydroisomorphainane, 80 cc. of ethylene glycol, 28 cc. of 85% hydrazine hydrate and 2.3 g. of potassium hydroxide were refluxed for thirty minutes, then heated without a condensor until the temperature reached 200° C., maintained at this temperature for three hours. The cooled reaction mixture was poured into a large volume of water and the very light gray precipitate was collected, washed with water and dried, 3.10 g. (82%), M. P. 230–231° C. Analytically pure, 16-oxo-$\Delta^6$-dehydroisomorphinane melts at 236–236.5° C.

EXAMPLE 6

Preparation of $\Delta^6$-dehydroisomorphinane 4.9 grams of 16-oxo-$\Delta^6$-dehydroisomorphinane was placed in an extraction thimble and extracted into a solution of 5 g. of lithium aluminum hydride in refluxing tetrahydrofuran (200 ml.). After a total reaction time of 84 hours the complex was decomposed with water and dilute hydrochloric acid (2.5N). The acid solution was filtered and added slowly to an alkaline solution of sodium tartrate. The secondary amine was taken up in ether, dried over sodium sulfate and concentrated in vacuo, to obtain $\Delta^6$-dehydroisomorphinane as an oil.

EXAMPLE 7

Preparation of N-methyl-$\Delta^6$-dehydroisomorphinane

A 20 ml. volume of 88% formic acid was added with cooling to the $\Delta^6$-dehydroisomorphinane prepared in Example 6. After the further addition of 10 ml. of 37% formaldehyde the solution was refluxed overnight. Concentration in vacuo, solution of the tertiary bases in methanol (25 ml.) and filtering to separate from formaldehyde polymers was followed by a second concentration to give the crude product. The colorless oil, N-methyl-$\Delta^6$-dehydroisomorphinane, was distilled at ca. 0.5 mm. (bath temperature 180–5° C.). A methanol solution of a portion of the base when treated with a slight excess of hydrobromic acid and triturated with ether gave 290 mg. of crude HBr salt (from 225 mg. of base). Recrystallization from methanol ether gave 250 mg. of the hyrobromide salt of N-methyl-$\Delta^6$-dehydroisomorphinane, M. P. 249–50° C. (uncorr.).

EXAMPLE 8

*Preparation of 5,6-dimethoxy-4-cyanomethyl-1,2-naphthoquinone*

Ten grams of good quality 5,6-dimethoxy-1,2-naphthoquinone is suspended in a mixture of 340 cc. of 95% alcohol and 6.8 cc. of ethyl cyanoacetate in a 2-liter Erlenmeyer flask. Fourteen cc. of triethylamine is added with swirling. The cold yellow suspension immediately becomes deep purple and the quinone goes into solution. The flask is swirled vigorously from 3 to 4 minutes and a solution of 30.5 g. of $K_3Fe(CN)_6$ in 100 cc. of water is then added all at once, and the flask is swirled vigorously under the tap from 5 to 7 minutes. A solution of 8 g. of sodium carbonate in 800 cc. of water is then added, the contents swirled and filtered to remove a very small amount of fluffy insoluble material.

The deep purple filtrate is transferred to a 4-liter beaker and acidified with 100 cc. of 6 M sulfuric acid added all at once with stirring. The finely divided yellow precipitate rapidly turns dark orange and is cooled after being allowed to stand 10 to 15 minutes at room temperature. The precipitate is then washed well with water and then slurried in the funnel with 25 cc. of 95% alcohol, drained and washed with two 10 cc. portions of 95% alcohol which serves to remove dark tarry impurities completely. Drying of the precipitate so isolated in the oven yields the cyanoacetate condensate which melts at 212.5–214° C. corr.

In a 1-liter Erlenmeyer flask 20 g. of the cyanoacetic ester condensation product prepared above is added to 200 cc. of Claisen's alkali (35 g. KOH, 85 cc. water, 65 cc. methanol) at 30° C. temperature. The reaction mixture is swirled for 4 minutes accompanied by cooling, and changes from bluish purple to deep crimson At the end of 4 minutes 20 cc. of methanol were added and the mixture is swirled another minute, cooled in ice, and acidified all at once with a solution of 230 cc. of 6 N HCl and 80 cc. of water (ice cold). (KCl does not separate at this concentration and at this temperature, but may be expected to at a lower temperature.)

The mixture soon crystallizes as a dirty orange precipitate which is cooled 15 minutes after standing and cooling to room temperature, washed with several successive portions of water to remove the potassium chloride, slurried into a funnel with about 20 cc. of methanol, sucked dry, and washed with 10 cc. more of methanol. The precipitate 5,6 - dimethoxy - 4 - cyanomethyl - 1,2 - naphthoquinone when dried in an oven is obtained as a light orange-colored, finely divided crystalline material of a melting point 225–227° C. corr., with decided softening from 223° C.

EXAMPLE 9

*Preparation of 3,3-dimethoxy-9,10-dioxo-13-cyanomethyl-5,8,9,10,13,14-hexahydrophenanthrene*

This compound is prepared by heating the 3 g. of 5,6-dimethoxy-4-cyanomethyl-1,2-naphthoquinone in 30 cc. of anhydrous dioxane with 20 cc. of butadiene for 48 hours in a pressure bottle. The reaction temperature is maintained in an oil bath at 87–90° C. The contents of the flask are evaporated to dryness, dissolved into methanol, norited, filtered, and allowed to crystallize. The product, 3,4 - dimethoxy - 9,10 - dioxo - 13 - cyano - methyl-5,8,9,10,13,14-hexahydrophenanthrene, is in the form of nearly colorless prisms which melt at 237–238.5° C.

EXAMPLE 10

*Preparation of 3,4-dimethoxy-10,16-dioxo-$\Delta^6$-dehydroisomorphinane*

This compound is prepared in a manner identical with the preparation of 10,16-dioxo-$\Delta^6$-dehydroisomorphinane of Example 4 above, with the exception that 3,4-dimethoxy - 9,10 - dioxo - 13 - cyanomethyl - 5,8,9,10,13,14-hexahydrophenanthrene is utilized as a starting material. The product so obtained was found to melt at 237–238.5° C.

EXAMPLE 11

*Preparation of 3,4-dimethoxy-16-oxo-$\Delta^6$-dehydroisomorphinane*

3,4 - dimethoxy - 10,16 - dioxo - $\Delta^6$ - dehydroisomorphinane is reduced by the Wolff-Kishner method as in Example 5 followed by remethylation. The remethylation step is necessary since under the conditions of the reduction the methoxyl groups are at least partially cleaved. Remethylation is conveniently carried out on the diluted crude reduction mixture by treatment with dimethyl sulfate. The product shows M. P. 263–264.5° C.; ultraviolet $\lambda$ max. 281 m$\mu$, log $\epsilon$ 4.16.

EXAMPLE 12

*Preparation of 3,4-dimethoxy-$\Delta^6$-dehydroisomorphinane*

3,4-dimethoxy-16-oxo-$\Delta^6$-dehydroisomorphinane is reduced with lithium aluminum hydride as described under Example 6. The product was not characterized but was methylated directly as shown in Example 13.

EXAMPLE 13

*Preparation of 3,4-dimethoxy-N-methyl-$\Delta^6$-dehydroisomorphinane*

The treatment of 3,4-dimethoxy-$\Delta^6$-dehydroisomorphinane with formaldehyde-formic acid as described under Example 7 gave the N-methyl compound. This product is an oil which was characterized as the picrate, M. P. 198.5–200° C.

Various changes and modifications may be made in carrying out the present invention without departing from the spirit and scope thereof. Insofar as these changes and modifications are within the purview of the annexed claims, they are to be considered as part of my invention.

I claim:
1. A 4-cyanomethyl-1,2-naphthoquinone.
2. 5,6-dialkoxy-4-cyanomethyl-1,2-naphthoquinone.
3. 5,6-dimethoxy-4-cyanomethyl-1,2-naphthoquinone.
4. The process for preparing a 4-cyanomethyl-1,2-naphthoquinone which comprises reacting a 1,2-naphthoquinone with a cyanoacetic acid ester in the presence of a basic catalyst, and reacting the resulting 4-carboxycyanomethyl ester with a strong base.
5. The process for preparing a 4-cyanomethyl-1,2-naphthoquinone which comprises reacting a 1,2-naphthoquinone-4-sulfonic acid with a cyanoacetic acid ester in the presence of a basic catalyst, and reacting the resulting 4-carboxycyanomethyl ester with a strong base.
6. The process for preparing a 4-cyanomethyl-1,2-naphthoquinone which comprises reacting a 5,6-dialkoxy-1,2-naphthoquinone with a cyanoacetic acid ester in the presence of a basic catalyst, and reacting the resulting 4-carboxycyanomethyl ester with a strong base.
7. A 9,10-dioxo-13-cyanomethyl-5,8,9,10,13,14-hexahydrophenanthrene.
8. 9,10-dioxo-13-cyanomethyl - 5,8,9,10,13,14 - hexahydrophenanthrene.
9. 3,4-dialkoxy-9,10-dioxo-13-cyanomethyl-5,8,9,10,13,14-hexahydrophenanthrene.
10. 3,4-dimethoxy-9,10-dioxo-13-cyanomethyl-5,8,9,10,13,14-hexahydrophenanthrene.
11. The process for preparing a 9,10-dioxo-13-cyanomethyl-5,8,9,10,13,14-hexahydrophenanthrene which com- prises reacting a 4-cyanomethyl-1,2-naphthoquinone with butadiene.

12. The process for preparing 3,4-dialkoxy-9,10-dioxo-13-cyanomethyl - 5,8,9,10,13,14 - hexahydrophenanthrene which comprises reacting 5,6-dialkoxy-4-cyanomethyl-1,2-naphthoquinone with butadiene.

13. The process for preparing 3,4-dimethoxy-9,10-dioxo-13-cyanomethyl - 5,8,9,10,13,14 - hexahydrophenanthrene which comprises reacting 5,6-dimethoxy-4-cyanomethyl-1,2-naphthoquinone with butadiene.

14. A 10,16-dioxo-Δ⁶-dehydroisomorphinane.

15. 10,16-dioxo-Δ⁶-dehydroisomorphinane.

16. A 3,4-dialkoxy - 10,16-dioxo-Δ⁶-dehydroisomorphinane.

17. 3,4 - dimethoxy - 10,16-dioxo-Δ⁶-dehydroisomorphinane.

18. The process for preparing a 10,16-dioxo-Δ⁶-dehydroisomorphinane which comprises reacting a 9,10-dioxo-13-cyanomethyl - 5,8,9,10,13,14 - hexahydrophenanthrene with hydrogen in the presence of a copper-chromium oxide catalyst.

19. The process for preparing 10,16-dioxo-Δ⁶-dehydroisomorphinane which comprises reacting 9,10-dioxo-13-cyanomethyl - 5,8,9,10,13,14 - hexahydrophenanthrene with hydrogen in the presence of a copper-chromium oxide catalyst.

20. The process for preparing 3,4-dialkoxy-10,16-dioxo-Δ⁶-dehydroisomorphinane which comprises reacting 3,4-dialkoxy-9,10-dioxo-13-cyanomethyl - 5,8,9,10,13,14-hexahydrophenanthrene with hydrogen in the presence of a copper-chromium oxide catalyst.

21. The process for preparing 3,4-dimethoxy-10,16-dioxo-Δ⁶-dehydroisomorphinane which comprises reacting 3,4-dimethoxy-9, 10-dioxo-13-cyanomethyl-5,8,9,10,13,14-hexahydrophenanthrene with hydrogen in the presence of a copper-chromium oxide catalyst.

22. A 16-oxo-Δ⁶-dehydroisomorphinane.

23. 16-oxo-Δ⁶-dehydroisomorphinane.

24. A 3,4-dialkoxy-16-oxo-Δ⁶-dehydroisomorphinane.

25. 3,4-dimethoxy-16-oxo-Δ⁶-dehydroisomorphinane.

26. The process for preparing a 16-oxo-Δ⁶-dehydroisomorphinane which comprises reacting a 10,16-dioxo-Δ⁶-dehydroisomorphinane with hydrazine hydrate and an alkali metal hydroxide.

27. The process for preparing 16-oxo-Δ⁶-dehydroisomorphinane which comprises reacting 10,16-dioxo-Δ⁶-dehydroisomorphinane with hydrazine hydrate and an alkali metal hydroxide.

28. The process for preparing a 3,4-dialkoxy-16-oxo-Δ⁶-dehydroisomorphinane which comprises reacting a 3,4-alkoxy-10,16-dioxo-Δ⁶-dehydroisomorphinane with hydrazine hydrate and an alkali metal hydroxide.

29. The process for preparing a 3,4-dimethoxy-16-oxo-Δ⁶-dehydroisomorphinane which comprises reacting a 3,4-alkoxy-10,16-dioxo-Δ⁶-dehydroisomorphinane with hydrazine hydrate and an alkali metal hydroxide.

30. An isomorphinane compound having the formula

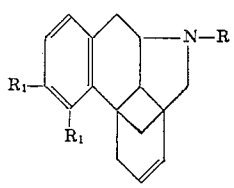

wherein R is a substituent from the group consisting of lower alkyl and hydrogen, and R₁ is a substituent from the group consisting of lower alkoxy and hydrogen.

31. An N-lower alkl-Δ⁶-dehydroisomorphinane.

32. N-methyl-Δ⁶-dehydroisomorphinane.

33. A compound of the formula:

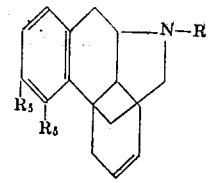

wherein R is a lower alkyl substituent and R₅ is a lower alkoxy substituent.

34. A 3,4-dimethoxy-N-lower alkyl-Δ⁶-dehydroisomorphinane.

35. 3,4-dimethoxy-N-methyl-Δ⁶-dehydroisomorphinane.

36. Δ⁶-dehydroisomorphinane.

37. A compound of the formula:

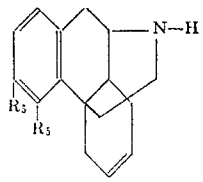

wherein R₅ is a lower alkoxy substituent.

38. 3,4-dimethoxy-Δ⁶-dehydroisomorphinane.

39. The process for preparing a Δ⁶-dehydroisomorphinane which comprises reacting a 16-oxo-Δ⁶-dehydroisomorphinane with lithium aluminum hydride.

40. The process for preparing Δ⁶-dehydroisomorphinane which comprises reacting 16-oxo-Δ⁶-dehydroisomorphinane with lithium aluminum hydride.

41. The process which comprises reacting a compound of the formula:

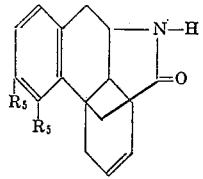

wherein R₅ is a lower alkoxy substituent with lithium aluminum hydride to form a compound of the formula:

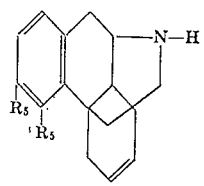

42. The process for preparing 3,4-dimethoxy-Δ⁶-dehydroisomorphinane which comprises reacting 3,4-dimethoxy-16-oxo-Δ⁶-dehydroisomorphinane with lithium aluminum hydride.

43. The process which comprises reacting a compound of the formula:

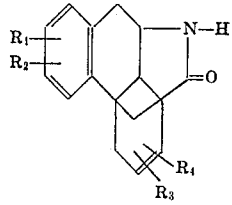

wherein R₁, R₂, R₃ and R₄ are substituents selected from the group consisting of hydrogen, lower alkyl and lower alkoxy groups, with lithium aluminum hydride to form a compound of the formula:
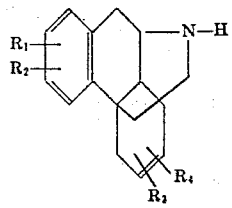
References Cited in the file of this patent
UNITED STATES PATENTS
2,524,855    Schnider et al.           Oct. 10, 1950
OTHER REFERENCES
Gates et al.: JACS, vol. 70, 1948 (June), pp. 2261–63 (Effect date February 1948).
Grewe et al.: Ann. der Chemie, vol. 564, pp. 172 and 181 only of article on pp. 161–198 (1949).
Small et al.: JACS, vol. 53, pp. 2214–2226 (1931).